Oct. 21, 1969  M. BERGHGRACHT  3,473,446
PROCESS FOR THE MANUFACTURE OF PAPER OR SIMILAR MULTI-PLY
BAGS, AND BAGS OBTAINED BY THE PROCESS
Filed March 24, 1967  8 Sheets-Sheet 1

INVENTOR
MARIUS BERGHGRACHT

INVENTOR
MARIUS BERGHGRACHT

INVENTOR
MARIUS BERGHGRACHT

INVENTOR
MARIUS BERGHGRACHT

United States Patent Office 3,473,446
Patented Oct. 21, 1969

3,473,446
PROCESS FOR THE MANUFACTURE OF PAPER OR SIMILAR MULTI-PLY BAGS, AND BAGS OBTAINED BY THE PROCESS
Marius Berghgracht, Le Vieux Logis, Place Joyale, Vineuil-St.-Firmin, Oise, France
Filed Mar. 24, 1967, Ser. No. 630,173
Claims priority, application Luxembourg, Mar. 29, 1966, 50,779
Int. Cl. B31b 1/22, 1/62, 49/04
U.S. Cl. 93—35                    7 Claims

ABSTRACT OF THE DISCLOSURE

A flattened, multi-ply tube is provided with an outer ply having pairs of longitudinal slits extending inwardly from an end of the tube, the material between the corresponding slits of the two pairs presenting free end flaps whereas the end flap regions of the inner plies are joined together. The end flaps of the inner plies are first folded back and adhered in overlapping relation and then the end flaps of the outer ply are folded back and adhered in overlapping relation to each other and to the end flaps of the inner plies. The regions of the outer ply between each pair of slits may be left in place to provide a valve, or they may be folded outwardly before folding back of the end flaps of the inner plies and then folded over and adhered to the end flaps of the inner plies before the end flaps of the outer ply are folded back.

BACKGROUND OF THE INVENTION

A multi-ply bag is produced from a flattened tube which has multiple plies interconnected locally by adhesive, the tube being cut off at right-angles at the ends through all of the plies. To form a bag bottom, the corresponding tube end is opened out flat by turning over inwards two parts in the form of triangles, each of which has an apex disposed at an edge of the flattened tube, the base of the triangle being parallel to the latter edge while the other two sides form an angle of 45° therewith. Conventionally, the transverse edges of the open end of the bag, such edges forming long flaps or turnovers, are folded on to one another and secured together, the bag bottom being finally covered by a protective label, the use of which complicates manufacture and is responsible for extra paper and labour costs.

SUMMARY OF THE INVENTION

According to the invention, a flattened multi-ply tube is provided, at each end where a bottom is required, and in the front and back surfaces of just the tube outer ply near each lateral edge of the tube, with a cut or incision which extends parallel to the nearby side edge and is distant therefrom by an amount equal to or slightly greater than half the width of the base of the required bag bottom, each incision extending from the tube end edge as far as the nearbly oblique line along which the nearby triangular part will be folded when the tube end is opened out flat during bottom formation, at least one side of the outer ply end being left free relatively to the inner plies over a distance at least equal to the length of the said incisions, for forming a free long flap or turnover of the outer ply, whereafter the bottom is closed by folding the long flaps one on to another, in such a way that a free long flap of the outer ply is folded down last of all and that the long flap formed by the inner plies lying underneath said free flap is folded down before the other long flap of the outer ply, while to secure the bag bottom the parts covering each other are glued during the bottom formation, except at the place where it is required to form a valve.

According to an advantageous embodiment of the invention, the lateral flaps which are bounded by the incisions of the outer ply and which have been turned over simultaneously with the triangular parts of the inner plies, are then raised and bent outwards except at the place where it is required to form a valve, and each such raised flap is then folded down after at least two long flaps have been folded one on to another.

The lateral or side flaps of the outer ply may be left in contact with the triangular parts of the inner plies, the long flaps of the inner plies and of the outer ply then being folded over on top. Alternatively the outer ply side flaps first may be folded outwards, then folded over and stuck to the long flaps of the inner plies which have already closed the bag bottom. If the side flaps bounded by the incisions are slightly wider than the bag bottom, the bag bottom corners are even tighter and stronger, since the corners of the bottom which has been formed by the inner plies are then completely covered by the projecting edges of such side flaps which are specially stuck at this place.

At the bag corner where a valve is required, the small side flap of the outer ply which is disposed at such corner is left in contact with the triangular part formed by the inner plies instead of being raised, and those parts of the long flaps of the inner plies and of the outer ply which will subsequently cover such side flap are not stuck, so as to leave a free passage into the bag between such side flap and all the long flaps, so that a valve is formed without the need to use an extra piece of paper or the like.

Once the side flaps and long flaps of the outer ply have been bent and stuck to the bag bottom formed by the inner plies, the complete system increases bag strength, more particularly if the outer ply is stronger than the inner plies, which can even be made of thinner paper than is usual. For instance, a bag having an outer ply of 80 g./m.$^2$ and inner plies of 60 g./m.$^2$ is stronger than a bag in which all the plies are made of 70 g./m.$^2$ paper, and saves considerably on paper.

BRIEF DESCRIPTION OF THE DRAWINGS

33 and 34 are enlarged cross-sectional views of the bottom during and after folding down of the long flaps one on to another, respectively.

DETAILED DESCRIPTION OF THE INVENTION

Figure 1:
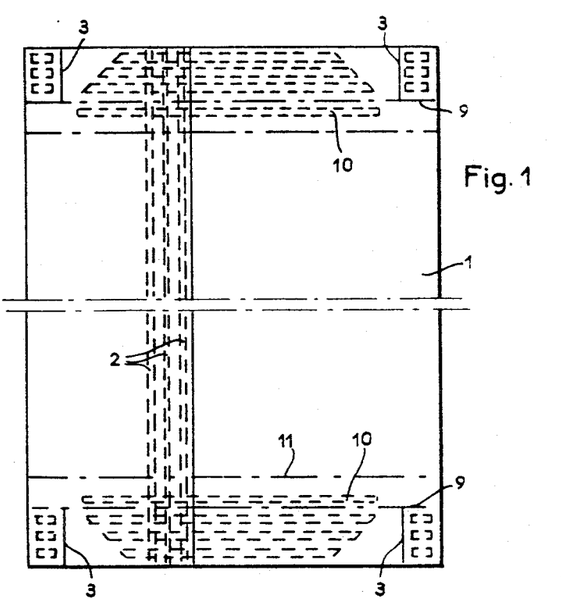
FIG. 1 shows a multi-ply tube serving as a blank for a bag.

FIG. 1 shows a flat tube 1 which, in the particular example chosen, comprises four plies, it being appreciated that the precise number of plies is immaterial.

Figure 2:
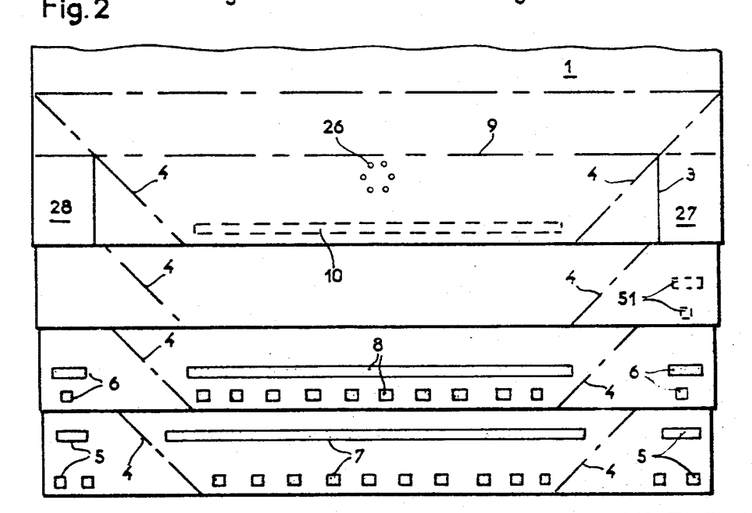
FIG. 2 is an enlarged view of one end of the tube, the various plies thereof being offset longitudinally from one another to make the drawing clearer and facilitate the description of the drawing.
Figure 3:
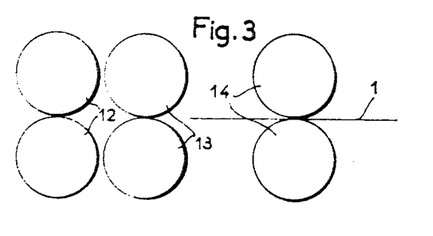
FIGS. 3, 5, 7, 9, 11, 13, 15, 17 and 19 are views in side elevation of various consecutive stations of a bag-manufacturing installation.
Figure 29:
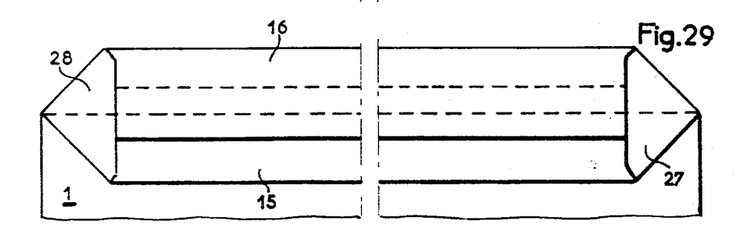
FIG. 29 shows the finished end produced according to the modification of FIGS. 27 and 28.
Figure 30:
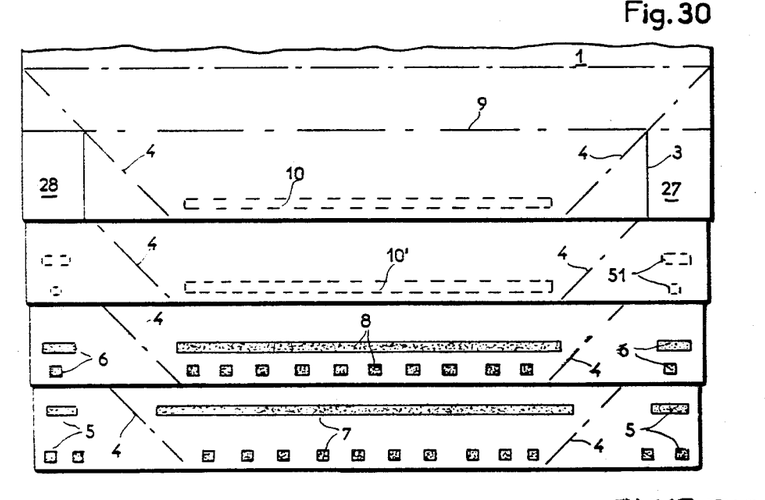
FIG. 30 is a view similar to FIG. 2 but showing a further modification of the invention.

The plies are assembled on a tubing machine by longitudinal glued zones 2 and various transverse glued zones which can be seen more clearly in FIG. 2. At each end of the tube where a flat bottom is to be formed, four notches or cuts 3 are made in the outer ply only when the same is still flat and separated from the other plies— i.e., two cuts in the front and two in the back. Each cut extends parallel to the adjacent side edge of the flattened tube and is separated therefrom by a distance equal to half the width of the subsequent bottom (FIGS. 3–26) or slightly greater (FIGS. 27–29). The cuts 3 each extend from the tube end edge to one of the inclined fold lines 4 bounding the triangular parts which are bent flat when a tube end is opened to form the bag bottom.

Suitable adhesive or glue is applied while in the tubing machine on each side of the tube to interconnect the tubes at the required places. To interconnect the three inner plies firmly, adhesive regions 5, 6 are provided on the two inner plies outside the locations of the cuts 3 and adhesive regions 7, 8 are provided between the locations of the cuts 3 near the tube end edge i.e., on the parts which subsequently will be folded along a transverse line 9. The outer ply is connected to the third ply by a transverse adhesive regions 10 applied thereto inside the line 9 so as to leave free those end parts of the outer ply which subsequently will be folded along the line 9. These various adhesive regions are not provided so as to register with each other but are staggered so as to facilitate drying and increase the flexibility and therefore strength of the bag bottom.

The bag bottom may be formed, for instance, by means of a machine such as is diagrammatically shown in the drawings, as follows:

First, the scorings marking the fold lines 9, 11 (facilitating opening and flattening of the tube end) and 4 are marked by means of respective rollers 12, 13, 14 (FIGS. 3,4); if required, rollers which produce the required scorings simultaneously can be used. Some scorings, inter alia the scoring 9, can have a double or M-shape to facilitate folding in either direction.

Figures 4, 6, 7, 8, 9, 10:
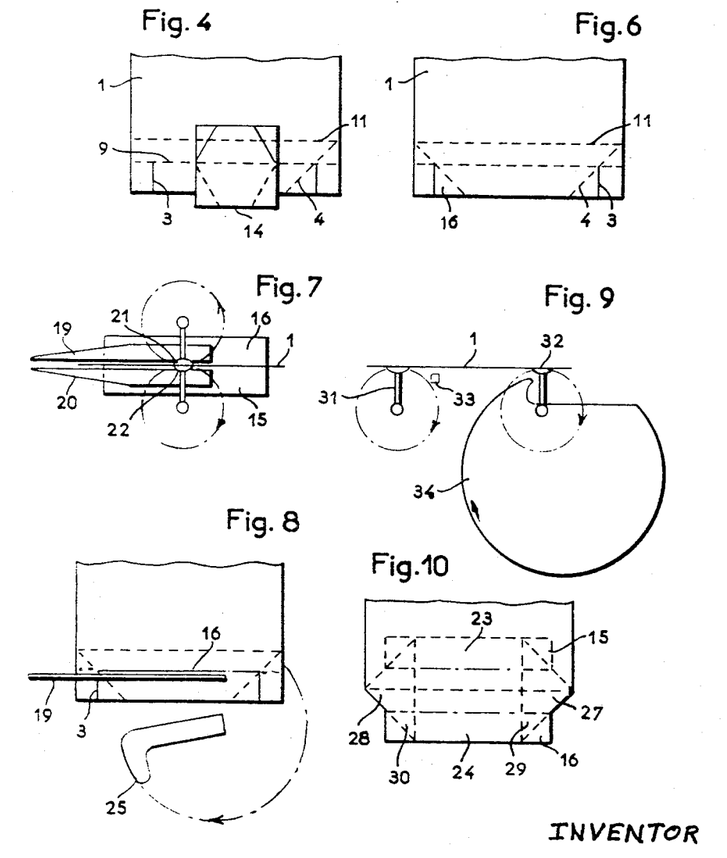
FIGS. 4, 6, 8, 10, 12, 14, 16, 18 and 20 are partial plan views showing the various phases in the formation of a bag bottom which is folded on the lower surface of the tube.
Figure 5:
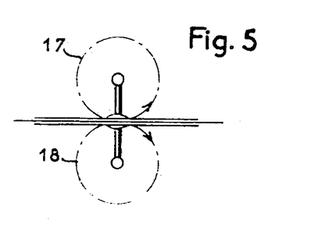
Figure 21:
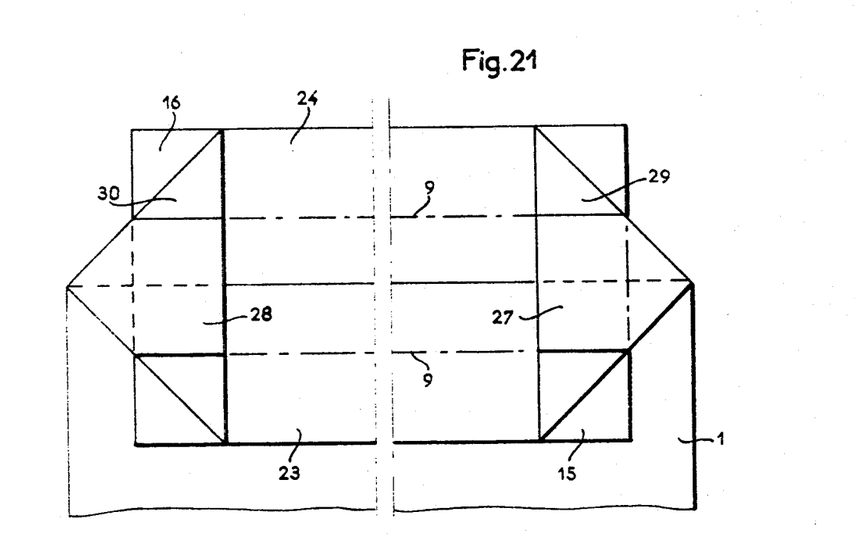
FIG. 21 shows one end of a tube opened flat to form a bottom but the tube being turned round so that the bottom is on the top surface of the tube, exactly as in FIGS. 22–25 and 27–29.

Next the long flaps 15, 16 which are disposed between the incisions 3 of the outer ply and which will form the turnovers thereof are raised. This is performed by means of rotary suckers 17, 18 (FIG. 5) and inclined surfaces 19, 20 (FIGS. 7, 8). Raising the flaps 15, 16 gives access to the inner plies which are engaged by rotary suckers 21, 22 (FIG. 7), the same raising the long flaps or turnovers 23, 24 of the complete system of stuck-together inner plies, while a rotary blade 25 opens the tube end out flat, as shown in FIGS. 10 and 21. To simplify this operation, each flap 15, 16 may be formed with a hole or perforations 26 (FIG. 2) enabling the suckers 21, 22 to act directly on the collection of plies, in which event the suckers 17, 18 and the inclined surfaces 19, 20 may be omitted.

Figure 11:
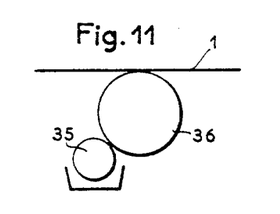
Figures 12, 14, 15, 17, 19:
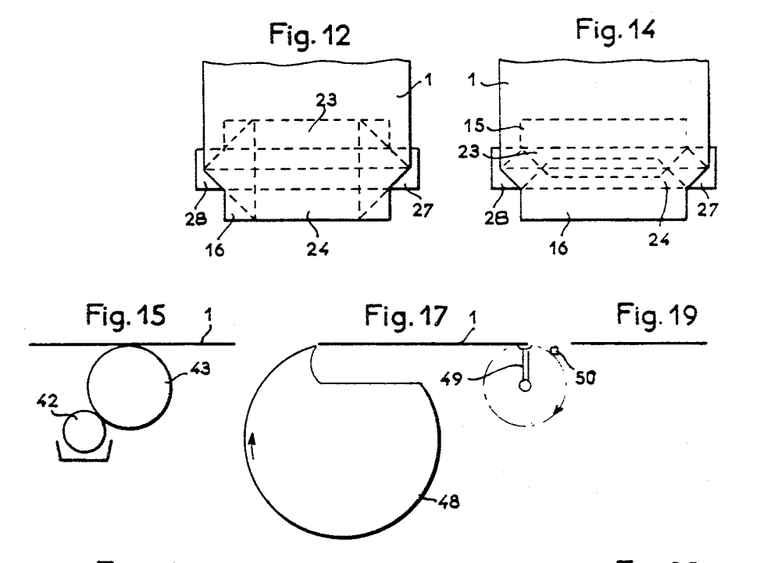
Figure 13:
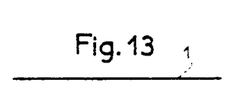
Figure 16:
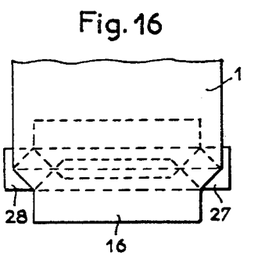
Figure 18:
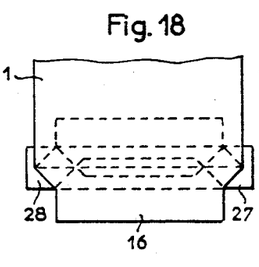
Figure 20:
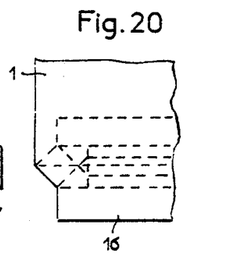

As FIG. 21 clearly shows, small side flaps 27, 28 bounded by the incisions 3 are then disposed on the triangular parts 29, 30 of the inner plies. Suckers 31, 32 synchronized with bag movement then raise the flaps 27, 28. Sucker 31 starts the operation of rotating the flap 27 which then meets a stationary transverse rod 33 which completes the operation and places the flap 27 substantially flat, for instance, at an angle of about 20°. The sucker 32 raises the flap 28, and a rotary sector 34 which is of appropriate shape and whose peripheral velocity is greater than the speed of bag movement completes the rotation of the flap 28 at 180°. Instead of the sector 34, a horizontal blade similar to the blade 25 could be used. The bag bottom is then as shown in FIG. 12. At the work station shown in FIG. 11, adhesive zones 37, 38, 39, 40 and 41 (FIG. 22) are applied, for instance, by means of rollers 35, 36, and at the work station shown in FIG. 13 the flaps 23, 24 are turned over. Adhesive zones 44–47 (FIG. 23) are applied, for instance, by means of rollers 42, 43, at the work station shown in FIG. 15; the zones 44–47 are offset from one another to prevent lines of adhesive from being placed one above another during final folding and to accelerate drying.

Figure 24:
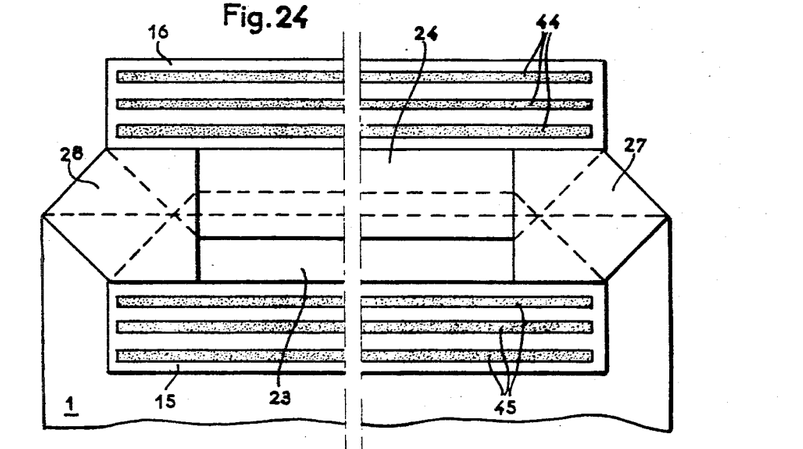
Figure 25:
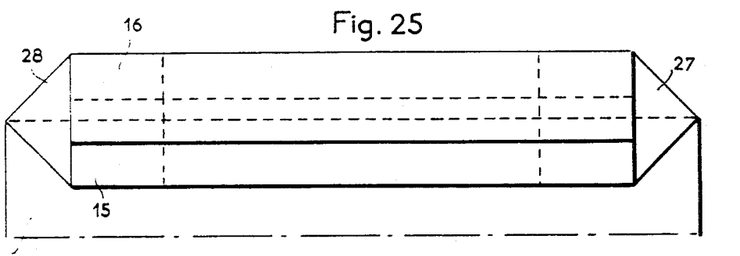

The folding of the inner plies forms a closed bag bottom onto which the flaps bounded by the incisions 3 in the outer ply will be folded. First, the flaps 27, 28 are folded over to cover the side edges of the turnovers 23, 24 and thus ensure that the finished bottom will be satisfactorily tight and very strong, something to which the homogeneity of the stuck zones of the outer ply contributes (FIG. 24). This guaranteed tightness and strength is a great advantage of the invention. The folding-over can be effected by the synchronised mechanism which is shown diagrammatically in FIG. 17. A sector 48 rotating much faster than the speed of bag advance engages with the rear flap 27 and rotates the same through 180°. A sucker 49 raises the flap 28 to present the same below a stationary rod 50 which rotates the flap 28 as the bag advances. The bag bottom is then as shown in FIG. 24. The flaps 15, 16 of the outer ply are then folded over, whereafter the finished bag bottom is as shown in FIG. 25. The flaps 15, 16 cover the edges of the flaps 27, 28 and the edge of the turnover 24, thus adding to the tightness and strength of the bag bottom.

Figure 26:
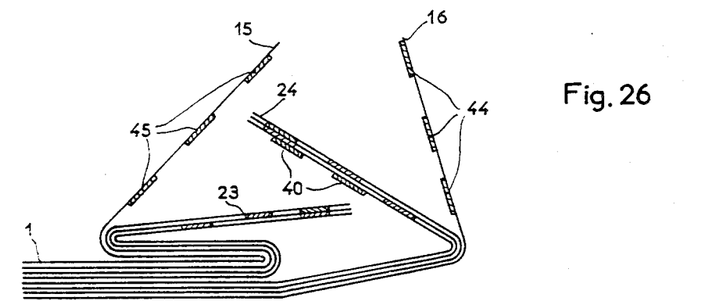
FIG. 26 is a view to an enlarged scale and in cross-sections showing how the long flaps of the bottom are folded one on another.
Figure 27:
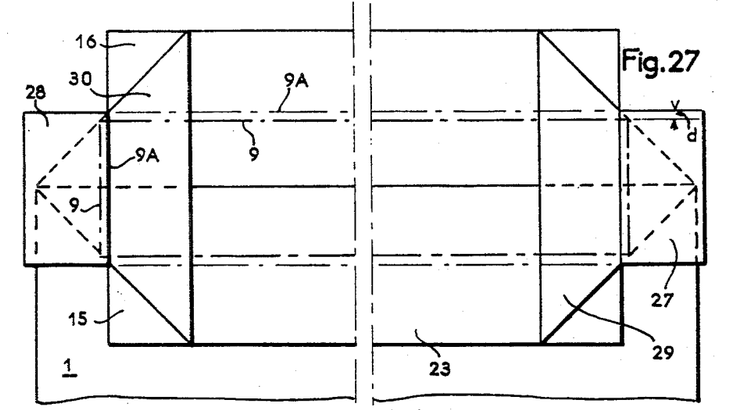
FIGS. 27 and 28 show two phases in the formation of a modified form of bag, the glued zones not being shown.

FIG. 26 shows how the turnovers 23, 24, 15, 16 are folded consecutively; the lateral flaps 27, 28, which are not shown in FIG. 26, become interleaved with the turnovers 24, 15.

To form a valve in a bottom, for instance, at the flap 27, adhesive spots 51 are placed on the front and back of the penultimate ply in the tube-making machine, at the places which contact the flap 27 so that the same is rigidly connected to the tube inner plies. The flap 27 is not raised, the sucker 31 and rod 33 not operating in this case. Similarly, the adhesive spots 37, 41 (FIG. 22), the adhesive zones 47 and the hatched zones 52, 53 of the adhesive zones 44, 45 (FIG. 23) are omitted, to ensure that the turnovers 23, 24 and 15, 16 do not stick to the flap 27 when folded over, and to leave a free passage between the flap 27 and such turnovers.

Figure 28:
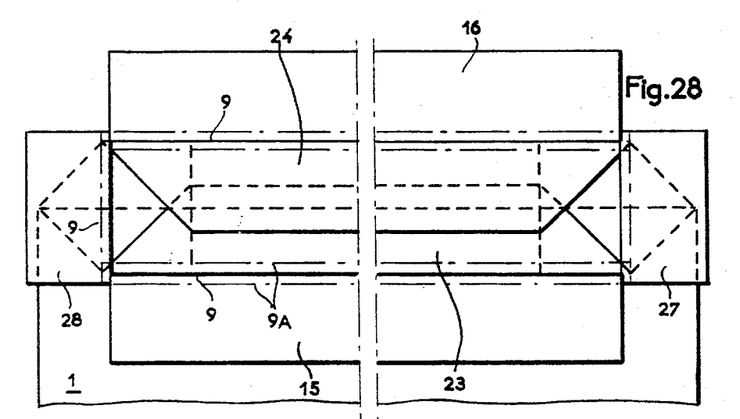

FIGS. 27–29 show a modification which increases the strength and tightness of the bag bottom by disposing the incisions 3 slightly further away from the tube edge, this shift $d$ being, for instance, from 3 to 5 mm. in the case of a bag for cement or the like, so that the flaps 27, 28 are slightly wider than the bag bottom. The flaps 27, 28 therefore completely cover the corners of the bag bottom formed after the folding of the turnovers 23, 24, and also cover the oblique edges thereof, so that the bag bottom tightness and strength is increased.

Actually, the bag bottom shaping process is the same as in the case shown in FIGS. 1–26.

The rotation of the wider flaps 27, 28 can be facilitated if the single score or fold line 9 is replaced by a double or M scoring as indicated by the lines 9, 9A in FIGS. 27 and 28, from which the adhesive zones have been omitted for the sake of clarity in the drawings.

According to another embodiment of the invention, illustrated in FIGS. 30–34, the bottom of the bag can be executed in a simpler manner, while yet obtaining almost all of the above mentioned advantages. In particular, there will preferably also be used an outer ply which is thicker (e.g., 80 g./m.$^2$) than the inner plies (e.g., 60 g./m.$^2$).

A tube (FIG. 30) is used, which is similar to the one shown in FIG. 2 except as far as the adhesive zone 10 is concerned, which is situated on the side of the bag body relative to the score line 9. The said adhesive zone 10 is applied to the top side only of the outer ply, i.e., the upper side of the outer tube as it moves through the machine for forming the bottoms of the bags. As to the securing of the bottom side of the outer ply, i.e., the lower side of the tube as it moves through the said machine, the adhesive zone is offset to 10′, i.e., a position similar to that of the adhesive zones 7 and 8. Moreover, the adhesive spots 51 are placed at both sides of the tube in the case that the lateral flaps 27, 28 are not raised, as shown in FIGS. 31–34.

In this embodiment, only the long flap 16 of the outer ply remains free. The bottom formation is operated as follows on a machine as described hereabove.

After marking the score lines 9 and 11, only the long flap of the outer ply, which is situated at the upper side, is raised by means of the sucker 17 (FIG. 5) and the inclined surface 19 (FIG. 7). Raising such long flap gives access to the adjacent inner ply, thus allowing the tube end to be opened out in the usual manner by means of the suckers 21, 22 (FIG. 7) and the rotary blade 25 (FIG. 8), the bag bottom then being in the condition shown in FIGS. 10 and 21.

Figure 22:
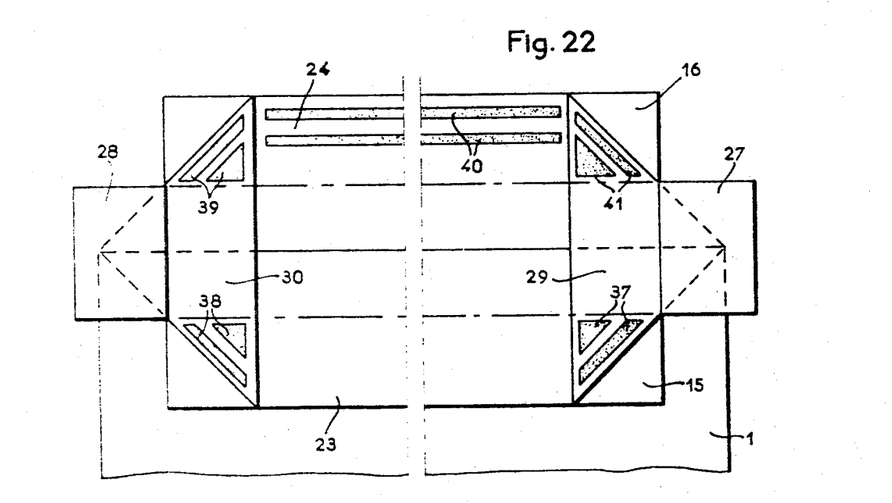
FIGS. 22–25 show consecuive phases in the gluing and folding of such bottom.
Figure 23:
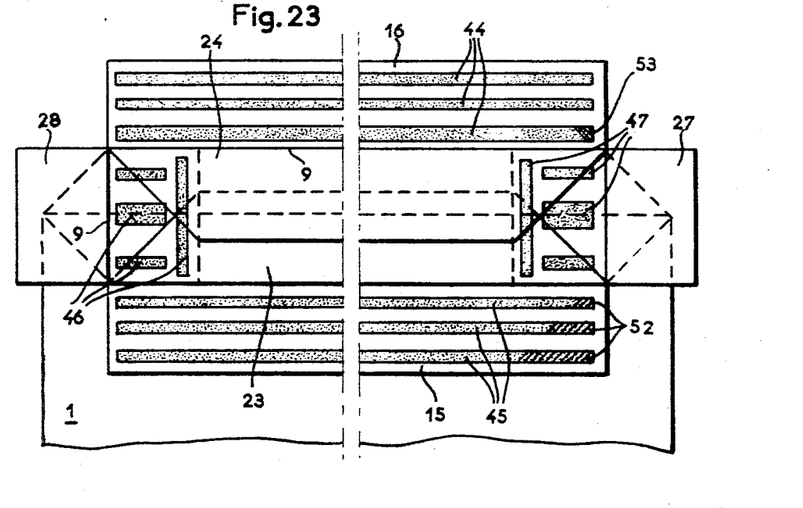
Figure 31:
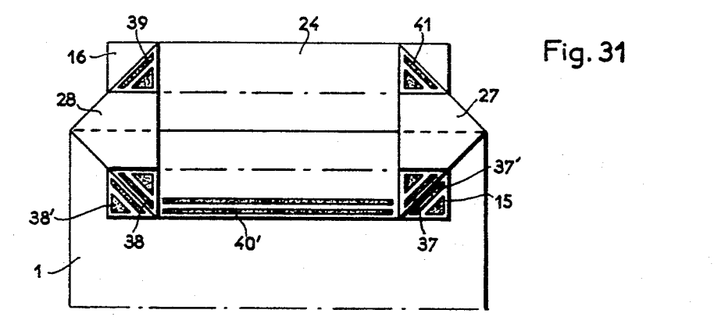
FIGS. 31 and 32 show two phases of the bottom formation according to the modification of FIG. 30, and FIGS.
Figure 32:
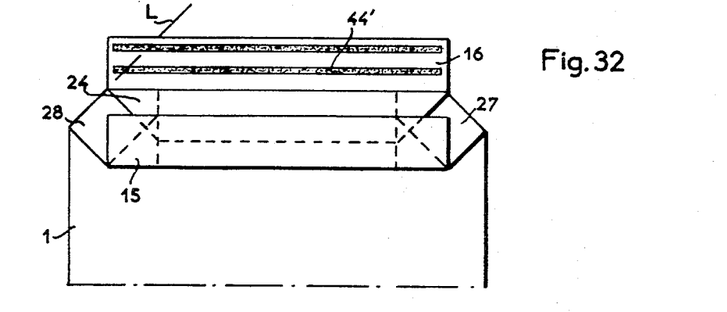
Figure 33:
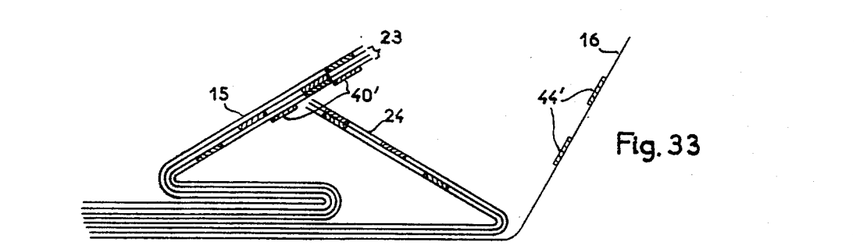
Figure 34:
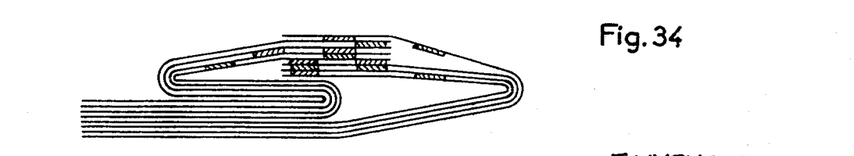

The first application of adhesive (FIG. 11) is then performed as shown in FIG. 31, i.e., at 37, 38, 39 and 41 as in FIG. 22, whereas instead of the adhesive zone 40 on the flap 24, an adhesive zone 40′ is applied on the flap 23 (FIG. 31). Furthermore, adhesive zones 37′, 38′ are applied on flap 15, one of which adhesive zones will, however, be omitted whenever a valve is required at the corresponding end of the bottom. The flap 24 is then folded down and thereafter the flap formed by the assembly of flaps 23 and 15, secured together by the adhesive 10′, is folded down on to flap 24. At the second adhesive applying station (FIG. 15) the adhesive zones 44′ are then applied to the flap 16, which is then folded down, whereupon the bottom presents itself as shown in FIG. 25. The folding steps are clearly shown in FIGS. 33 and 34.

The bottom as shown in FIGS. 30–34 can be formed with a valve by inserting a reinforcing valve piece according to the conventional method, but it is also possible to form a valve without the use of such reinforcing piece. In the latter case, the valve of the bag can be obtained directly, e.g., where flap 28 is situated, if the adhesive spots 38, 38′ and 39 are omitted and if the left end portion of the adhesive zone 44′, i.e., to the left of line L (FIG. 32), is omitted on the part of flap 16 which will come into contact with the lateral flap 28.

The formation of a valve without using a reinforcing piece is easy to perform due to the use of a stronger paper or the like for the outer ply than for the inner plies.

It should be noted that it is advantageous to use the order of succession of the folding operations as described with reference to FIGS. 31–34, the flaps 15 and 23 being secured together. In practice, it has proved more difficult to perform the folding in the reverse order, while secured together flaps 16, 24 and separating flaps 15 and 23.

What I claim is:

1. The method of making a multi-ply bag which includes the steps of:
    forming a tube having inner and outer layers adhered together with the outer layer being free from securement to the inner layer at one end of the tube, said outer layer also having two pair of longitudinal slits extending inwardly from said one end of the tube, the slits of each pair being spaced apart a predetermined distance and positioned such that the tube is symmetrical about a plane passing midway between each pair of slits,
    flattening the tube along its plane of symmetry to provide opposite side edge folds which pass midway between each pair of slits,
    opening and flattening said one end of the flattened tube by infolding the corners of said one end to fold one side of the flattened tube back upon itself along a transverse line of fold spaced inwardly from the inner ends of said slits and thereby present oppositely extending end flaps on opposite sides of said transverse line of fold,
    folding the oppositely extending end flaps of the inner layer back upon themselves into overlapping relation to each other and adhering the overlapped portions together,
    and then folding the oppositely extending end flaps of the outer layer back upon themselves into overlapping relation to each other and adhering the overlapped portions together and to the folded back end flaps of the inner layer.

2. The method of making a multi-ply bag which includes the steps of:
    forming a multi-ply tube provided with an outer ply having two pairs of longitudinal slits extending inwardly from one end of the tube, such pairs of slits being symmetrically disposed on the tube,
    flattening the tube to present opposite side folds and infolding opposite side end portions of the tube to fold back one side of the tube upon itself along a transverse line of fold extending between said side folds and spaced inwardly from the inner ends of said slits to thereby present oppositely etxending end flaps on opposite sides of said transverse line of fold, the infolding producing triangular portions of the inner plies having divergent lines of fold commencing at each side fold and intersecting the inner ends of the slits of a corresponding pair of slits,
    folding the oppositely extending end flaps of the inner plies back upon themselves along fold lines substantially in line with the inner ends of corresponding slits and into overlapping relation and adhering the overlapped portions to each other,
    and then folding the oppositely extending end flaps of the outer ply back upon themselves along fold lines extending between the inner ends of corresponding slits and into overlapping relation to each other and adhering the overlapped portions of the outer ply together and to the folded back portions of the inner plies.

3. The method according to claim 1 wherein the infolded regions of the outer ply between each pair of slits are folded outwardly along their bases prior to folding of the end flaps of the inner plies, and including the step of folding such regions into overlapping adhered relation to the end flaps of the inner plies after the latter are folded and adhered together.

4. The method according to claim 1 wherein one of the infolded regions of the outer ply between each pair of slits is folded outwardly along its base prior to folding of the end flaps of the inner plies, said end flaps of the inner plies being free from attachment to the other infolded region of the outer ply to provide a valve, and including the step of folding said one region into overlapping, adhered relation to the end flaps of the inner plies after the latter are folded and adhered together.

5. The process according to claim 1 including the step of perforating the outer ply in the regions of said end flaps thereof.

6. In a process for making multi-ply bags which comprises the steps of forming a multi-ply tube, flattening the tube, and then forming a bottom at least one end of the flattened tube, the improvement comprising the steps of:
    slitting the outer ply to extend longitudinally inwardly from said one end of the tube to provide registering pairs of slits in the top and bottom layers of the flattened tube adjacent either side edge of the flattened tube,
    opening up the top and bottom layers of the flattened tube at said one end thereof by infolding opposite side corner portions of said one end of the tube to lie along a transverse line of fold positioned inwardly of the inner ends of said slits and fold the end flap of said top layer of the flattened tube back upon itself along such line of fold, folding back the end flaps of the inner plies back upon themselves on either side of said line of fold and onto overlapping relation to each other, securing the overlapping portions together, folding back the end flaps of the two layers of the outer ply which lie between the slits in each layer back upon themselves and into overlapping relation to each other, and securing the overlapping portions of the outer ply to each other and to the underlying inner ply end flaps.

7. In the process according to claim 6 wherein at least one side flap lying between an initially registering pair of slits and which is folded flat by said unfolding step is folded outwardly prior to folding back of the end flaps of said inner plies and is folded flat again and secured to the overlapping end flaps of the inner plies prior to folding back the end flaps of said outer ply.

References Cited
UNITED STATES PATENTS

| | | | |
|---|---|---|---|
| 2,013,086 | 9/1935 | Baker | 93—33 X |
| 2,570,047 | 10/1951 | Burroughs | 93—33 X |
| 2,609,734 | 9/1952 | Bardet | 93—8 |
| 2,753,768 | 7/1956 | Hahn | 93—8 |
| 2,818,003 | 12/1957 | Browning | 93—8 |
| 2,845,214 | 7/1958 | Finke | 93—56 |
| 3,329,070 | 7/1967 | Scharff | 93—8 |

WAYNE A. MORSE, Jr., Primary Examiner

U.S. Cl. X.R.

93—1, 8, 33